May 10, 1949.　　　　E. T. WYMAN　　　　2,469,679
GAS TURBINE
Filed July 13, 1944
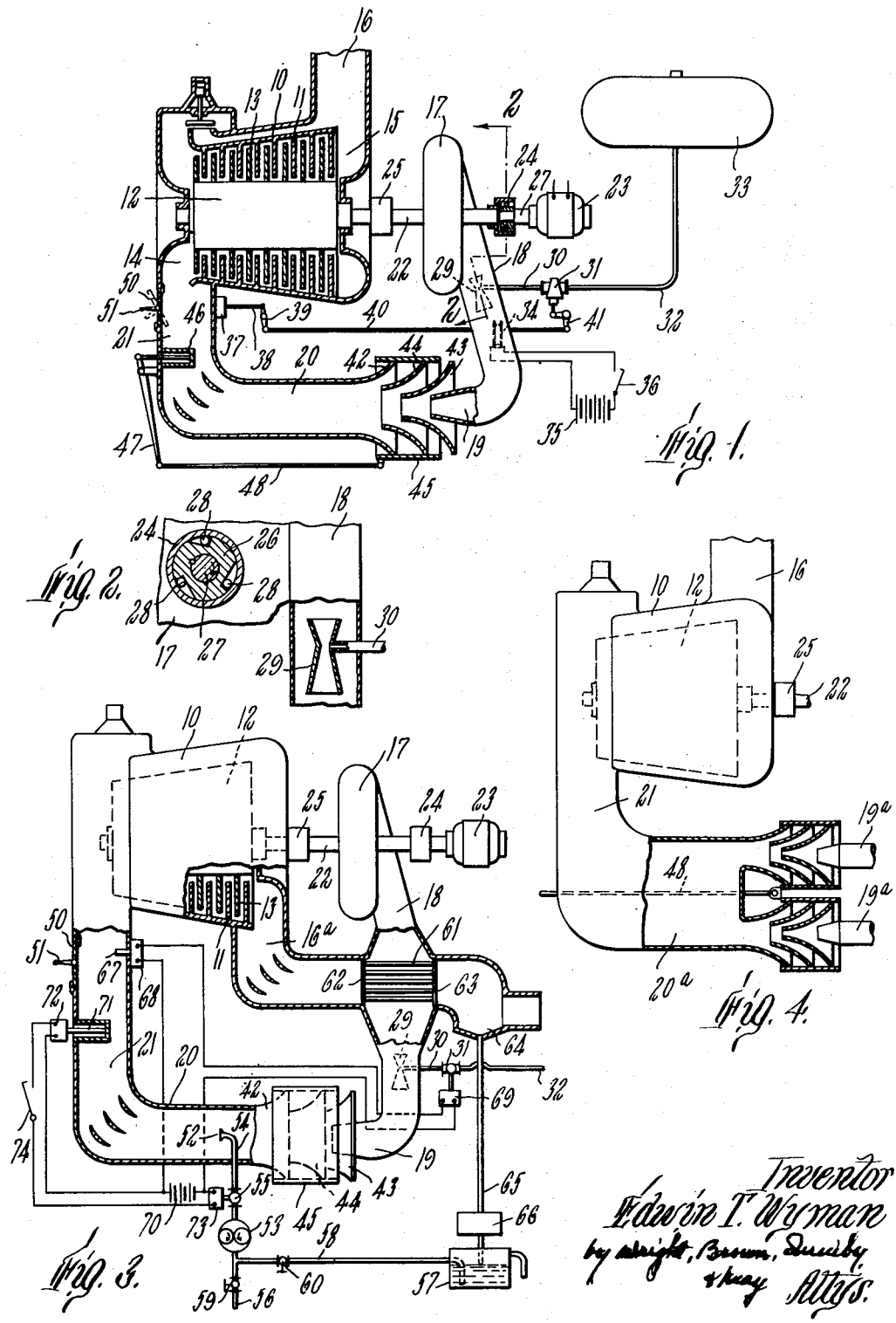
Inventor
Edwin T. Wyman Patented May 10, 1949

2,469,679

UNITED STATES PATENT OFFICE 2,469,679

GAS TURBINE

Edwin T. Wyman, Brookline, Mass.

Application July 13, 1944, Serial No. 544,715

1 Claim. (Cl. 60—42)

The present invention relates to turbines of the type in which air is compressed and combined with fuel by combustion to generate hot gases by which the turbine is driven.

I have shown a turbine engine of this character in my prior application Serial No. 514,809, filed December 18, 1943, in which the air is compressed by an axial compressor driven by the turbine and with which are combined means for injecting water into the hot gases to be converted into steam thereby, means for starting it from rest and means for controlling the action of its operating parts.

The object of the present invention is to provide in a turbine of this general character a means by which the air and products of fuel combustion which constitute the working fluid are provided in desired volume at desired pressure and velocity by two stages of compression and a high velocity jet. The first stage of compression is exerted mechanically on a fraction of the air by a high pressure compressor of any suitable type, as a centrifugal compressor or one of the axial type shown in my prior application; the second stage is produced by heat through the partial combustion of fuel injected into the compressed air; and the compressed gases with a residue of unburned fuel are discharged through a jet at high velocity into a combustion chamber, entraining air with them, where combustion is completed and from which gases at high velocity are conducted to the turbine. This new means may be used in combination with means for injecting water into the hot gases, and without such water injecting means. A further object is to provide means for regulating the quantity of air provided for fuel combustion and for regulating the temperature of the hot gases, either in combination with, or without, means for regulating the fuel delivery.

The principles of turbine engines by which the foregoing objects are realized and in which the invention consists are shown in the accompanying drawing, in diagrammatic form, and described in the following specification; a number of illustrative embodiments of such principles being so shown and described.

In the drawing—

Fig. 1 is a diagrammatic view, partly in section, of one form of turbine engine embodying the invention;

Fig. 2 is a sectional view taken on line 2—2 of Fig. 1 showing details of the engine;

Fig. 3 is a diagrammatic view similiar to Fig. 1 showing a further embodiment of the invention including means for injecting water into the hot gases and controlling the water supply;

Fig. 4 is a diagrammatic view partly in section and partly in elevation showing a plurality of jet nozzles in place of the single nozzle shown in Fig. 1.

Like reference characters designate the same parts wherever they occur in all the figures.

The engine includes a turbine of the type shown in my prior application above identified, having a housing 10 supporting stationary guide vanes 11 and a rotor 12 carrying encircling blades or buckets 13 which are arranged in rows interspersed with rows of stationary guide vanes. An annular intake passage 14 leads to the smaller end of the turbine and an annular exhaust chamber 15 opens from the larger end of the turbine and is connected with an exhaust duct 16.

An important novel feature of the invention consists in means whereby a small volume of air is compressed to a high pressure, and is injected along with burning fuel through a jet nozzle or orifice into a combustion chamber, and in the combination therewith of provisions whereby additional air is entrained into the combustion chamber by such jet. These means include, in the embodiment here illustrated, a centrifugal compressor 17, a conduit 18 leading from the compressor, and in which a fuel burner is located, and a jet nozzle 19 at the extremity of the conduit 18. The jet nozzle is directed toward the open end of a combustion chamber 20 from which a duct 21 leads to the intake passage 14.

The centrifugal compressor may be any one of several known compressors of this type. It has a housing with an axial admission opening and a tangential connection with the delivery conduit 18, and a rotor equipped with blades which rotates in the housing. As this type of compressor is common and well known, a more detailed illustration than is given by these drawings is unnecessary. While a compressor of this type is desirable because of its relatively small bulk and small dimension in the direction of its axis, an axial compressor of the type shown in my prior application or of other suitable character may be used instead. The rotor of the compressor is carried by a shaft 22 which is preferably alined with the rotor 12 of the turbine and with a starting motor 23. The latter may be an electric motor, an internal combustion engine, or a starting device of any other suitable character, an electric motor being here shown for illustration. A clutch 24 is interposed between the shaft 22 and the motor 23 and a clutch 25 is interposed between shaft 22 and the turbine rotor 12. These clutches are of the one way or over-running type and may be ball clutches of well known character. The clutch 24 is shown in sectional detail in Fig. 2 and consists of an outer shell to which the numeral 24 is applied, secured to the shaft 22, a disk 26 secured to the armature shaft 27 of the motor, and balls or rollers 28 confined between the shell 24 and eccentric surfaces on the disk; these parts being so disposed that when the motor shaft runs faster than the compressor rotor, the balls are gripped between the shell and disk so as to transmit rotation to the shell and thereby to the shaft 22, but the compressor rotor will turn freely when driven by the turbine faster than the starting motor. Clutch 25 is of the same character arranged to impart rotation from the turbine rotor to the compressor rotor and to permit independent rotation of the latter when driven by the starting motor. However, the compressor may be driven independently of the turbine by any suitable motive power, and the turbine, compressor and starting motor may be coupled together directly within the contemplation of this invention.

One form of the burner in the conduit 18 is here shown and consists of a tube 29 extending lengthwise of the conduit, tapering from both ends to a zone of contracted diameter at an intermediate point, and connected with a fuel supply pipe 30 at the contracted zone. The supply pipe leads from a valve 31 to which fuel is conducted by a pipe 32 from a tank 33. The tube 29 with its contracted waist is in effect a Venturi tube arranged to apply a vacuum effect to the supply pipe whereby fuel is drawn into it if not otherwise under a pressure head.

Fuel admitted to the burner is ignited either in the conduit at the most advantageous point, or at the orifice of the nozzle, by any suitable means. An electric igniter 34 is here shown for that purpose in connection with a current source 35 and a control switch 36.

The heat of combustion increases the pressure of the gases traveling through the conduit 18 and causes them to issue from the nozzle 19 in a jet of high velocity. This jet, flowing into the open mouth of the chamber 20, causes air from the outside to enter with it. The velocity of the air stream and the supply of fuel may be and, when the engine is operating at full load, preferably are, too great to permit of complete combustion of the fuel in the conduit, whereby a mixture of flaming gases, unburned fuel and, possibly, uncombined air issues from the jet nozzle into the chamber 20, and the unburned fuel is completely burned therein by combining with the outside air which is entrained by the jet.

The compressor, the nozzle and the rate of fuel combustion are organized to cause the jet to issue from the nozzle at extremely high velocity, which may be as much as 6000 feet per second, or more. It may also be reduced to a much lower velocity when the rate of fuel delivery and speed of the turbine are decreased. The fuel admission may be regulated by the valve 31 either manually or automatically. I have shown in Fig. 1 an automatic regulator governed by the pressure of gases in the duct 21, consisting of a pressure responsive device 37 and a system of links and levers 38, 39, 40 and 41 coupled with the movable closing member in the valve. The pressure responsive device may contain a diaphragm or piston or other element adapted to be moved in response to variations in pressure of the gas and to transmit movement to the linkage. This control means is organized to reduce the supply of fuel when the pressure rises above a predetermined degree and vice versa. Alternatively, the fuel valve may be controlled by the temperature of the gas, and in Fig. 3 a thermostatic controller is shown, and later described, which may be used in substitution for the pressure controller above described.

The velocity of the gases flowing through the chamber 20 is much lower than that of the jet, due to the large diameter of the chamber. The chamber is indeed large enough to take in air greatly in excess of that needed for complete combustion of the fuel, in order to reduce the temperature of the hot gases to a degree which will avoid or reduce injury to the turbine blades. The entrance end or mouth of the chamber 20 is flaring or funnel shaped, as shown at 42 to facilitate entrance of the jet and secondary air. One, two or more funnel shaped guide vanes 43 and 44 are arranged in axially alined series between the chamber mouth 42 and the nozzle 19 with a spacing between each other and the nozzle tip sufficient for free flow of air. The sides of these funnels are curved in the longitudinal dimension in order to facilitate smooth flow of air. Although not an essential feature of the fundamental invention, they are useful and valuable for dividing the inflowing air stream and preventing turbulence.

They have an additional function in that they serve as part of means for throttling the inflow of air; the other part of such means being a tubular gate 45 which closely surrounds the larger ends of the funnels and the spaces between them and is movable endwise so as to close or open such spaces in greater or less measure.

The gate may be thus moved automatically in response to temperature differences of the gases in the duct 21. The means for so moving it may comprise a thermostat 46, a lever 47 or equivalent multiplying motion transmitter and a link 48, all organized and operated to move the gate in the direction for shutting off the passageways between the funnels when the temperature is low, and for moving it in the direction to admit more air when the gas temperature rises.

A door or damper 50 is provided in the side of the duct 21 preferably at a point near the connection of the duct with the turbine housing. This door, when open, permits flow of gases from the duct directly into the outer atmosphere, and it may be opened and closed manually or by automatic means. An arm 51 is here shown as typifying any such means.

When starting the engine from rest, the starting motor 23 is energized. This drives the rotor of the compressor independently of the turbine rotor. Fuel oil is caused to flow to the burner 29 and is ignited. In starting, the door 50 to the atmosphere is opened in order to relieve back pressure so that the jet from the nozzle 19 and the entrained secondary air may flow freely through the chamber 20 and acquire velocity and momentum. That is, the open door provides a path of much less resistance to free flow of gases than the tortuous paths between the vanes and the blades of the turbine. When the gases have acquired sufficient momentum to overcome the inertia of the turbine rotor, the door is closed, and all of the gases are then compelled to pass to the turbine. By this means a quick starting of the turbine is assured. When its rotor has acquired a speed as high as that of the starting motor 23, the one way clutch 25 takes hold and drives the air compressor, and the motor 23 is then stopped.

The switch by which its stopping and starting of motor 23 is controlled may be coupled with an automatic governor of any suitable character, driven by the turbine, and adapted to open the switch when the turbine has attained a prescribed speed. A governor and driving means therefor suitable for this purpose are shown in my prior application Serial No. 514,809. Of course the starting motor can be controlled manually, either by means of the same governor controlled switch or a separate switch suitably connected in its circuit.

Water may be injected into the chamber 20 for the purpose both of cooling the hot gases and of generating steam to augment the driving effort by virtue of the expansive energy of steam. Fig. 3 shows the same turbine combination as above described together with auxiliary apparatus for injecting water into the stream of hot gases and means for condensing the steam generated therefrom and the water vapor produced by combustion.

The water injecting means comprises a spray head 52 to which water is supplied by a pump 53 through a pipe line 54 in which a control valve 55 is inserted. The pump may draw water from a source (not shown) through a pipe 56 or from the tank 57 through a pipe 58, or partly from both sources, valves 59 and 60 being coupled in both pipe lines for permitting or preventing flow through either one. The pump may be driven by a motor under manual or automatic control, as shown in my said prior application, or otherwise.

A condenser 61 is here shown which is like the air condenser shown in my said prior application and is a heat interchanger capable of transmitting heat from the exhaust vapors of the turbine to the air delivered from the compressor 17.

The exhaust duct 16a from the turbine is arranged to intersect the conduit 18 from the compressor, and the condenser is located at the intersection. It may consist of tubes mounted at their ends in tube sheets 62 and 63 which cross the exhaust duct and are disposed at opposite sides of the conduit 18 so that air passing through the latter flows between the tube sheets and around the tubes. Water condensed in the tubes collects in a sump 64 from which it flows through a pipe 65 and filter 66 to the tank 57. If desired, in order to condense the water vapors more completely, a water cooled condenser may be interposed in the exhaust duct between the condenser 61 and the sump 64, substantially as shown in my said prior application.

Fig. 3 shows thermostatic means for controlling the fuel valve 31, which may be substituted for the pressure operated means shown in Fig. 1. Such thermostatic means comprises a thermostat 67 in the admission duct 21, a variable current switch 68 operable by the thermostat, and a solenoid valve actuator 69 coupled in circuit with the switch 68 and a source of electric current 70. These elements are organized to open and close the valve more or less fully, and progressively, in prescribed ratio to different temperatures in the duct. Alternatively, the pressure operated means shown in Fig. 1 may be used instead of the thermostatic control means of Fig. 3; and both pressure and thermostatic means may be employed in conjunction to operate the fuel valve. Such dual control affords practically complete assurance against overheating or overspeeding the turbine.

An igniter such as that shown at 34 in Fig. 1 may be understood as being used with the engine combination now being described, although it is omitted from Fig. 3 to simplify the drawing.

An equivalent thermostat 71, switch 72 and valve actuator 73 are organized to control the water valve 55 so as to deliver more or less water to the spray head 52 according as the temperature of gases is higher or lower. A master control switch 74 is shown in the circuit of the last named valve controller.

The engine equipped with water injecting means may also be provided with an air inlet control gate 45 like that previously described, which may be operated by the same means as shown in Fig. 1 or by equivalent means under control of the thermostat 71, the operating means therefor being omitted for simplicity and clarity.

Engines embodying the invention may be provided with two or more high pressure compressors and high velocity jet nozzles instead of the one shown. Fig. 4 shows two such nozzles 19a and 19b, which may be supplied with air and combustion gases from separate compressors and fuel burners, or a single compressor and burner, or one compressor and a plurality of burners. Each nozzle may be combined with a series of guide vanes or not, as desired, and the guide vanes may be of annular form, each surrounding the axis of the chamber 20a, in which case there may be a circular series of nozzles directed toward the outermost annular space between the vanes and spaced equally apart around the axis of the chamber. Or there may be a series of complete funnels in line with each jet.

These drawings, being diagrammatic, do not show a supporting structure for the various parts of the apparatus, but it is within the province of the machine designer to provide adequate means for that purpose without detailed instructions by this disclosure.

The within described principles and improvements can be used in combination with any or all of the auxiliary features described in my prior application Serial No. 514,809, as desired.

What I claim is:

An engine combination comprising a gas turbine, an air compressor adapted to be driven by the turbine when the latter is running, a chamber coupled with the turbine for providing a supply of hot propelling gases, means for injecting water into said chamber to be vaporized by the hot gases therein, a heat interchanger in the paths of exhaust fluid from the turbine and air delivered by the compressor arranged to condense steam carried by the exhaust gases and impart heat to the compressed air, a nozzle connected to receive the compressed air after passing through the condenser and arranged to discharge into said chamber, a fuel burner in the connection between the condenser and nozzle, a collector for water condensed by the condenser, and means for transferring water from the collector to the chamber.

EDWIN T. WYMAN.

REFERENCES CITED

The following references are of record in the file of this patent:

UNITED STATES PATENTS

| Number | Name | Date |
|---|---|---|
| 1,163,650 | Fogler | Dec. 14, 1915 |
| 1,857,556 | Lasley | May 10, 1932 |
| 1,874,314 | Lasley | Aug. 30, 1932 |
| 2,056,198 | Lasley | Oct. 6, 1936 |
| 2,078,956 | Lysholm | May 4, 1937 |
| 2,096,184 | Lasley | Oct. 19, 1937 |
| 2,115,338 | Lysholm | Apr. 26, 1938 |
| 2,131,781 | Lysholm | Oct. 4, 1938 |
| 2,296,023 | Dallenbach | Sept. 15, 1942 |
| 2,353,929 | Ray | July 18, 1944 |
| 2,358,301 | Brauns | Sept. 19, 1944 |
| 2,396,068 | Youngash | Mar. 5, 1946 |

FOREIGN PATENTS

| Number | Country | Date |
|---|---|---|
| 3,607 | Great Britain | 1905 |
| 233,162 | Germany | Apr. 1, 1911 |
| 620,680 | France | Apr. 27, 1927 |